(12) United States Patent
Kim

(10) Patent No.: US 6,871,992 B2
(45) Date of Patent: Mar. 29, 2005

(54) BRAKE LIGHT SYSTEM

(76) Inventor: Seong Woong Kim, 165-17 33$^{rd}$ Ave., Flushing, NY (US) 11358

(*) Notice: Subject to any disclaimer, the term of this patent is extended or adjusted under 35 U.S.C. 154(b) by 0 days.

(21) Appl. No.: 10/252,942

(22) Filed: Sep. 23, 2002

(65) Prior Publication Data
US 2004/0057247 A1 Mar. 25, 2004

(51) Int. Cl.$^7$ ................................................. B60Q 1/26
(52) U.S. Cl. ........................ 362/541; 362/540; 362/272; 362/385; 340/940
(58) Field of Search ................................ 362/540–542, 362/485–488, 498, 499, 385, 468, 526, 527, 272; 340/940, 426.2, 450.1

(56) References Cited

U.S. PATENT DOCUMENTS

| | | | | |
|---|---|---|---|---|
| 3,094,683 A | * | 6/1963 | Watkins | 116/39 |
| 4,300,186 A | * | 11/1981 | Hurd | 362/540 |
| 5,038,136 A | * | 8/1991 | Watson | 340/480 |
| 5,406,250 A | * | 4/1995 | Reavell et al. | 340/433 |
| 5,558,424 A | * | 9/1996 | Zeligson | 362/542 |
| 5,980,070 A | * | 11/1999 | Hulse et al. | 362/385 |
| 6,299,336 B1 | * | 10/2001 | Hulse | 362/526 |
| 6,426,696 B1 | * | 7/2002 | Ortega | 340/479 |

* cited by examiner

Primary Examiner—Sandra O'Shea
Assistant Examiner—Ali Alavi
(74) Attorney, Agent, or Firm—McCarter & English, LLP

(57) ABSTRACT

A brake light system for a vehicle includes an indicating member movable between a first position and a second position, which is different from the first position. The indicating member is movable from its first position to its second position in response to the actuation of a brake system of the vehicle so as to indicate the extent of engagement of the brake system.

23 Claims, 5 Drawing Sheets

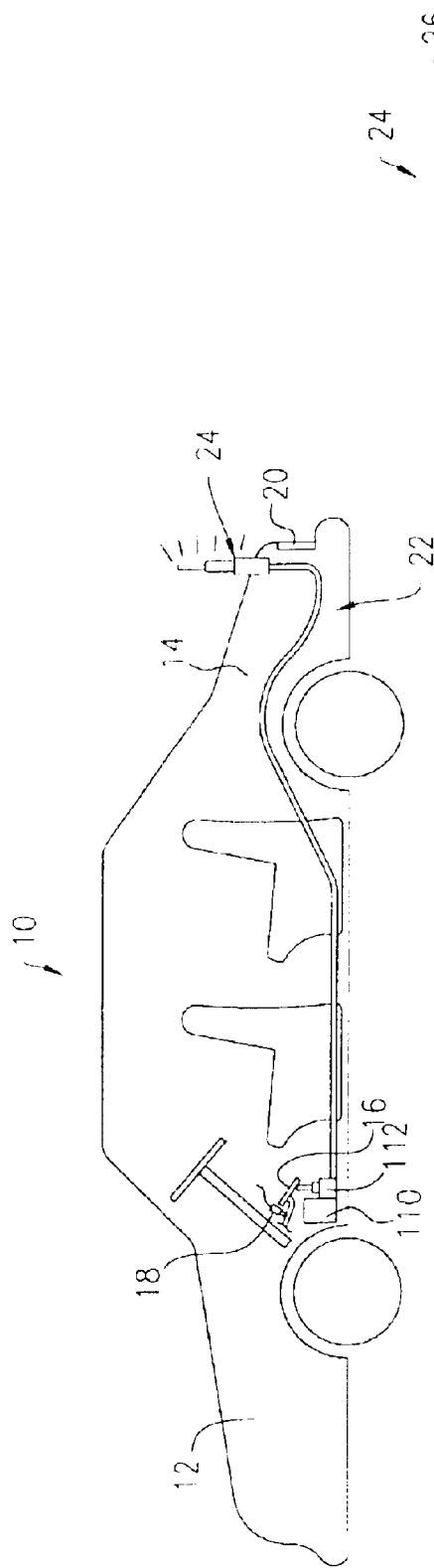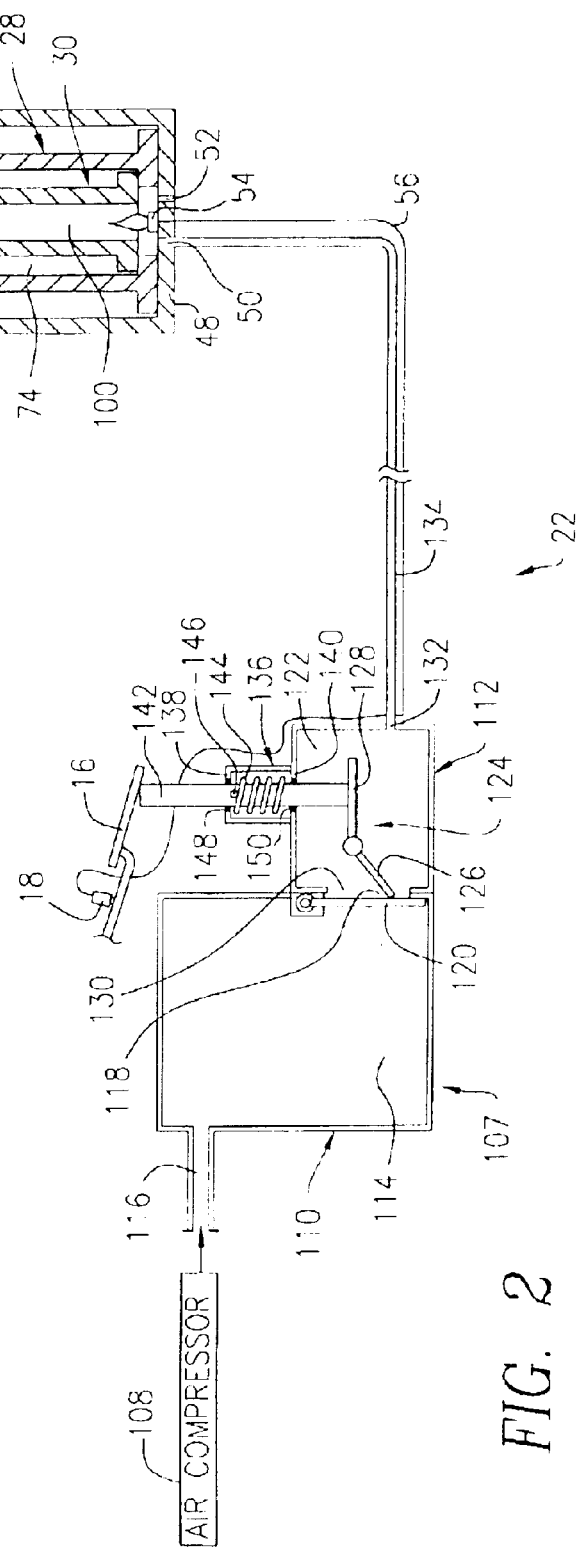
FIG. 1
FIG. 2

BRAKE LIGHT SYSTEM

FIELD OF THE INVENTION

The present invention relates to a brake light system and, more particularly, to a brake light system adapted to indicate the extent to which an associated brake system is actuated.

BACKGROUND OF THE INVENTION

Automobiles have a brake light system typically equipped with a pair of rear brake lights and a third brake light. These lights are activated (i.e., turned on) in response to the depression of an associated brake pedal by a driver. While these lights are adapted to signal the activation of the brake system to other drivers, they do not indicate the extent to which the brake pedal is depressed. In such circumstances, there is a need for a brake light system adapted to indicate the extent to which an associated brake system is actuated or engaged.

SUMMARY OF THE INVENTION

The present invention overcomes the disadvantages and shortcomings of the prior art discussed above by providing a new and improved brake light system for a vehicle. More particularly, the brake light system includes an indicating member movable between a first position and a second position, which is different from the first position. The indicating member is movable from its first position to its second position in response to the actuation of a brake system of the vehicle. In accordance with one feature of the present invention, the indicating member is movable pneumatically from its first position to its second position. The indicating member is movably mounted in an opening of a base member. The opening is sized and shaped so as to be pressurized in response to the actuation of the brake system such that the indicating member is movable to any one of an infinite number of positions between its first position and its second position in response to the pressurization of the opening so as to indicate the extent of engagement of the brake system. The indicating member is positioned in the opening when it is in its first position and extends outwardly from the base member when it is in its second position. The brake light system also includes a pressurized gas source for supplying pressurized gas to the opening of the base member.

BRIEF DESCRIPTION OF THE DRAWINGS

For a better understanding of the present invention, reference is made to the following detailed description of an exemplary embodiment of the present invention, considered in conjunction with the accompanying drawings, in which:

FIG. 1 is a simplified view of an automobile equipped with a brake light system constructed in accordance with the present invention;

FIG. 2 is a schematic view of a brake light system shown in FIG. 1, a brake pedal of the automobile being in a non-depressed state;

DETAILED DESCRIPTION OF THE INVENTION

Figure 3:
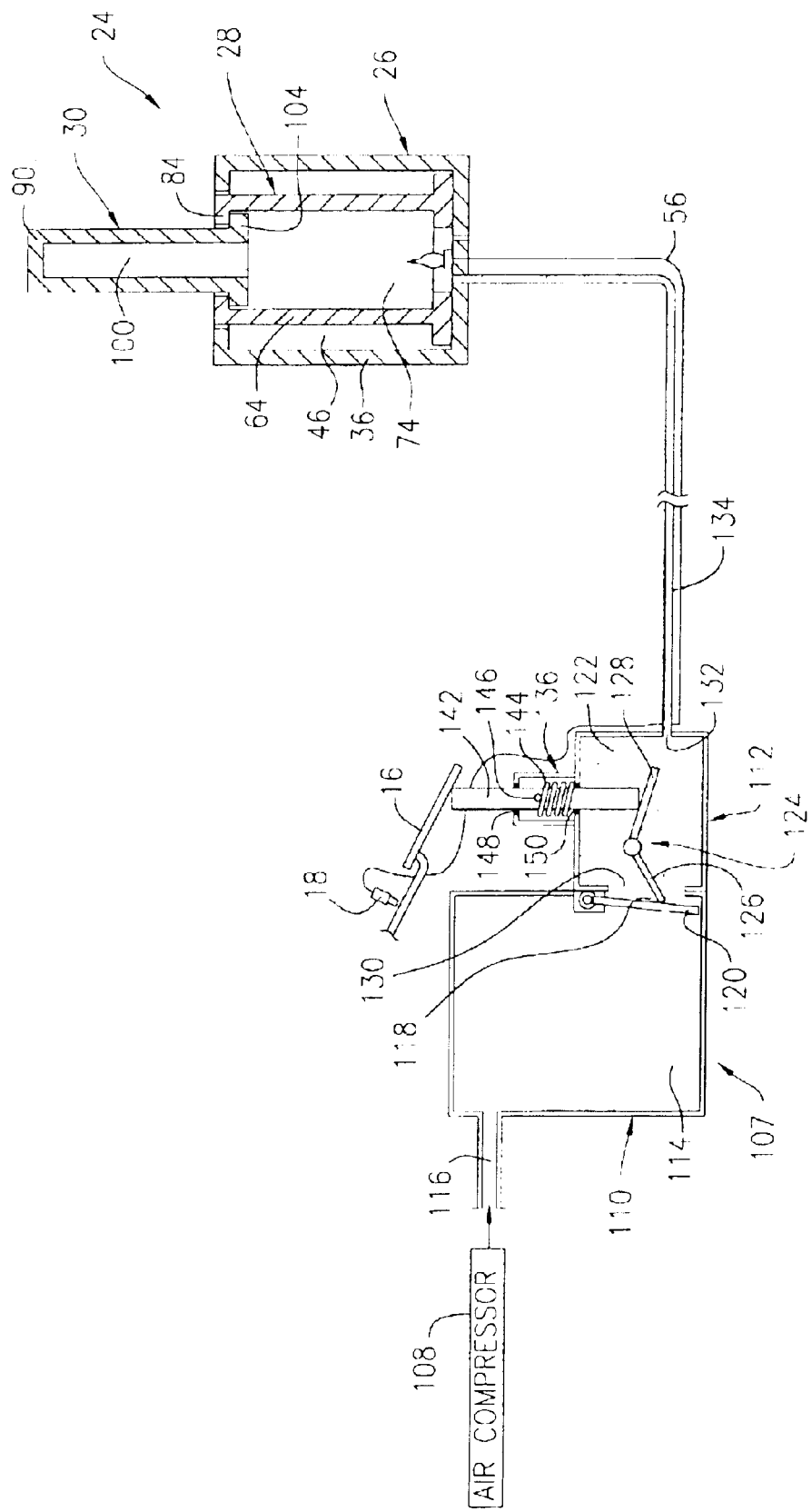
FIG. 3 is a view identical to FIG. 2, except that the brake pedal is in a partially depressed state.

Although the present invention can be used in conjunction with any type of motorized or non-motorized vehicle, it is particularly suitable for use in connection with motor vehicles, such as an automobile. Accordingly, the present invention will be described hereinafter in connection with an automobile. It should be understood, however, that the following description is only meant to be illustrative of the present invention and is not meant to limit the scope of the present invention, which has applicability to other types of motorized or non-motorized vehicles (e.g., motorcycles, bicycles, trains, etc.).

Referring to FIGS. 1 and 2, there is shown an automobile 10 having a front end 12 and a rear end 14. The automobile 10 also includes a conventional brake system equipped with a brake pedal 16, a brake light actuator 18 and rear brake lights 20 mounted to the rear end 14 of the automobile 10. As is conventional in the automotive field, when the brake pedal 16 is depressed by a driver, the brake light actuator 18 activates the rear brake lights 20 to indicate the actuation of the brake system.

With reference to FIGS. 1, 2, 5 and 6, the automobile 10 is equipped with a brake light system 22 constructed in accordance with the present invention. More particularly, the brake light system 22 includes a telescoping signal unit 24 mounted proximate to the rear end 14 of the automobile 10. The telescoping signal unit 24 has a base member 26, an intermediate member 28 and an inner member 30. The base member 26, which is fixedly attached to the rear end 14, has front and rear sides 32, 34 (see FIG. 6) and is provided with a cylindrical wall 36 having an inner surface 38, and an open upper end 40 and a lower end 42 (see FIG. 5). The inner surface 38 has a pair of keys 44 (see FIG. 6) elongated vertically and projecting radially inwardly for purposes to be discussed hereinafter. An opening 46 is formed in the cylindrical wall 36 between the upper end 40 and a lower end 42, while a bottom plate 48 is attached to the lower end 42 of the cylindrical wall 36. The bottom plate 48 is equipped with an inlet 50 for supplying compressed air to the opening 46 and an outlet 52 for releasing same from the opening 46. A light bulb 54 is mounted on the bottom plate 48 and is connected to the brake light actuator 18 via an electrical line 56 for illuminating the telescopic signal unit 24. The base member 26 also has an annular flange 58 which extends radially inwardly from the upper end 40 of the cylindrical wall 36.

Now referring primarily to FIGS. 3–6, the intermediate member 28 has front and rear sides 60, 62 and is provided with a cylindrical wall 64 having outer and inner surfaces 66, 68 and open upper and lower ends 70, 72. An opening 74 is formed in the cylindrical wall 64 between the upper and lower ends 70, 72. The inner surface 68 of the intermediate member 28 has a pair of keys 78 elongated vertically and projecting radially inwardly for purposes to be discussed hereinafter. The intermediate member 28 is also provided with a lower annular flange 80, which extends radially outwardly from the lower end 72 of the cylindrical wall 64, and a lower annular flange 82, which extends radially inwardly from the lower end 72 of the cylindrical wall 64. The lower annular flange 80 has a pair of notches 76 (see FIG. 6), each of which receives a corresponding one of the keys 44 of the base member 26 so as to prevent rotational movement of the intermediate member 28 relative to the base member 26. The upper end 70 of the intermediate member 28 is also provided with an upper annular flange 84 extending radially inwardly therefrom.

The intermediate member 28 is movably mounted in the base member 26. More particularly, the intermediate member 28 is movable between a retracted position, in which the intermediate member 28 is positioned in the opening 46 concentrically with the base member 26 (see FIG. 2), and an extended position, in which the intermediate member 28 extends vertically upwardly from the base member 26 through the open upper end 40 (see FIG. 4). In this regard, the lower annular flange 80 of the intermediate member 28 is sized and shaped so as to engage the annular flange 58 of the base member 26 and to hence prevent the intermediate member 28 from moving beyond its extended position (see FIG. 4).

Still referring to FIGS. 3–6, the inner member 30 has front and rear sides 86, 88 and is provided with a cylindrical wall 90 having outer and inner surfaces 92, 94, a closed upper end 96 and an open lower end 98. An opening 100 is formed in the cylindrical wall 90 between the upper and lower ends 96, 98. The lower end 98 of the inner member 30 has an annular flange 104 extending radially outwardly from the cylindrical wall 90. The annular flange 104 of the inner member 30 is provided with a pair of notches 102 (see FIG. 6), each of which receives a corresponding one of the keys 78 of the intermediate member 28 so as to prevent rotational movement of the inner member 30 relative to the intermediate member 28 and hence the base member 26.

The inner member 30 is movably mounted in the intermediate member 28. More particularly, the inner member 30 is movable between a retracted position, in which the inner member 30 is positioned in the opening 74 of the intermediate member 28 in a concentric manner (see FIGS. 2 and 6), and an extended position, in which the inner member 30 extends vertically upwardly from the intermediate member 28 through its open upper end 70 (see FIG. 4). In this regard, the annular flange 104 of the inner member 30 is sized and shaped so as to rest on the lower annular flange 82 of the intermediate member 28 when the inner member 30 is in its retracted position (see FIGS. 2 and 6). The annular flange 104 is also adapted to engage the upper annular flange 84 of the intermediate member 28 so as to prevent the inner member 30 from moving beyond its extended position.

Figure 5:
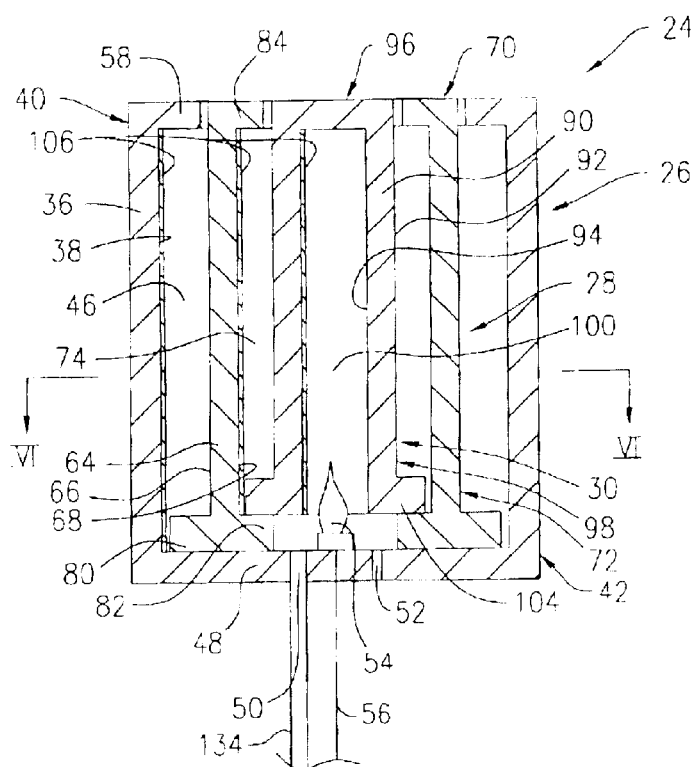
FIG. 5 is an enlarged cross-sectional view of a telescoping signal unit of the brake light system shown in FIG. 2.
Figure 6:
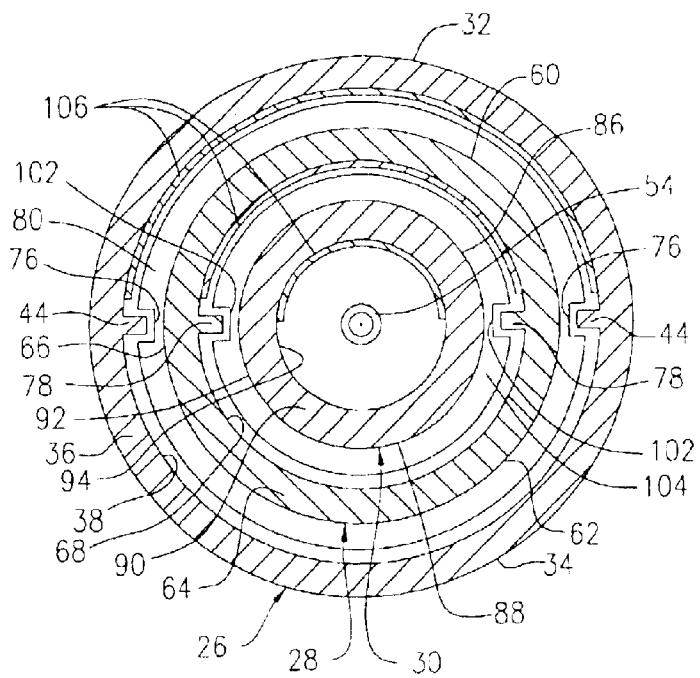
FIG. 6 is a cross-sectional view, taken along section line VI—VI and looking in the direction of the arrows, of the telescoping signal unit of the brake light system shown in FIG. 5.
Figure 7:
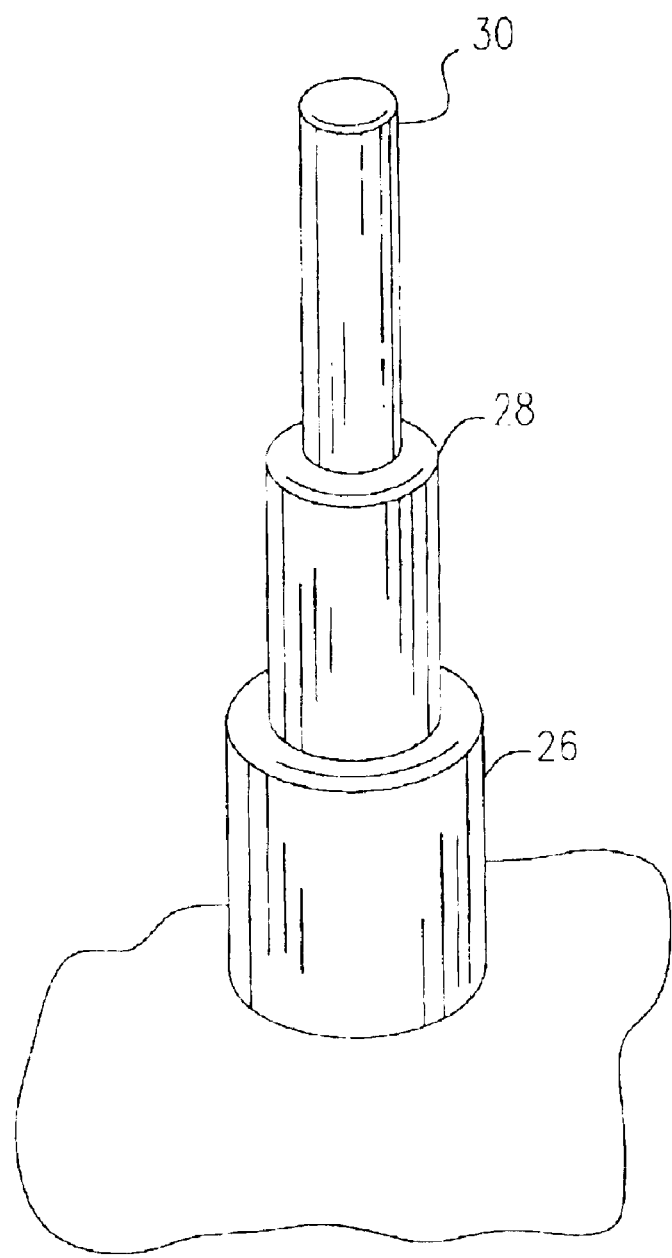
FIG. 7 is a perspective view of the telescoping signal unit of the brake light system shown in FIG. 4.

With reference to FIGS. 5–7, the cylindrical walls 36, 64, 90 of the base member 26, the intermediate member 28 and the inner member 30, respectively, are made from a suitable material (e.g., a translucent material or a conventional material used to make a red-colored cover for a rear brake light) such that, when the light bulb 54 is activated (i.e., turned on), the telescoping signal unit 24 can be illuminated. In this regard, the inner surfaces 38, 68, 94 of the base member 26, the intermediate member 28 and the inner member 30, respectively, are coated with a suitable material 106 (e.g., an opaque or reflective material) at their front sides 32, 60, 86, respectively, to prevent the light emitted from the light bulb 54 from being transmitted toward the front end 12 of the automobile 10 and hence from distracting the driver of the automobile 10. Alternatively, discrete or separate layers of opaque or reflective material can be attached (e.g., glued) to the inner surface 38 and/or the outer surface of the base member 26, the inner and/or outer surfaces 68, 66 of the intermediate member 28 and the inner and/or outer surfaces 94, 92 of the inner member 30.

Referring back to FIGS. 1 and 2, the brake light system 22 also includes a compressed air supply system 107 having a pressurized air source (e.g., an air compressor) 108, a supply tank 110 and an outlet tank 112, all of which are mounted in or on the automobile 10. The supply tank 110 has a chamber 114 and an inlet 116 connected to the air compressor 108 for conveying a constant supply of pressurized air from the air compressor 108 to the chamber 114. The supply tank 110 also has an outlet 118 for supplying pressurized air to the outlet tank 112. A spring-loaded valve plate 120 is pivotally attached to the supply tank 110 for opening and closing the outlet 118. More particularly, the valve plate 120 is pivotable between a fully open position (see FIG. 4), in which the valve plate 120 is disengaged from the outlet 118 so as to permit pressurized air to flow from the supply tank 110 to the outlet tank 112 through the outlet 118, and a closed position (see FIG. 2), in which the valve plate 120 is engaged with the outlet 118 so as to inhibit flow of pressurized air to the outlet tank 112.

Referring primarily to FIG. 2, the outlet tank 112 has a chamber 122 and a lever 124 mounted in the chamber 122. The lever 124 has an actuating section 126 located adjacent to the valve plate 120 and a rod-engaging section 128 extending away from the actuation section 126. The lever 124 is pivotable between an extended position, in which the actuating section 126 pushes the valve plate 120 to its open position (see FIG. 4), and a retracted position, in which the actuating section 126 permits the valve plate 120 to be positioned in its closed position (see FIG. 2). The outlet tank 112 also includes an inlet 130, which is in communication with the outlet 118 of the supply tank 110 for receiving pressurized air therefrom, and an outlet 132, which is connected to the inlet 50 of the telescoping signal unit 24 via a hose 134.

A rod housing 136 is formed on the outlet tank 112 and includes an upper opening 138, a lower opening 140 and an actuator rod 142 mounted to the housing 136 and extending through the upper and lower openings 138, 140. The actuator rod 142 is movable relative to the housing 136 between an upper position (see FIG. 2) and a lower position (see FIG. 4). A spring 144 is mounted on the actuator rod 142 for urging same toward its upper position, while a pin 146 is position on the actuator rod 142 for compressing the spring 144 as the actuator rod 142 moves from its upper position toward its lower position. Sealing members 148, 150 are also mounted in the upper and lower openings 138, 140, respectively, so as to form an air-tight seal between the rod 142 and the housing 136 and hence inhibit pressurized air from venting through the lower and upper openings 140, 138.

In operation, the supply tank 110 is constantly pressurized by a continuous supply of pressurized air from the air compressor 108. When the brake pedal 16 is depressed by a driver to actuate the brake system of the automobile, the brake light actuator 18 activates the light bulb 54 of the telescoping signal unit 24 and the rear brake lights 20. As the brake pedal 16 is depressed, it pushes the actuator rod 142 downwardly so as to cause same to move from its upper position (see FIG. 2) toward its lower position (see FIG. 3). In response, the actuator rod 142 causes the lever 124 to pivot from its retracted position toward its extended position and hence causes the valve plate 120 to move from its closed position (see FIG. 2) toward its open position (see FIG. 3). As a result, pressurized air flows from the supply tank 110 to the telescoping signal unit 24 through the outlet tank 112 and the hose 134 so as to pressurize the opening 46 of the base member 26. As the opening 46 of the base member 26 becomes pressurized, the inner member 30 moves from its retracted position (see FIG. 2) to its extended position (see FIG. 3). As a result, the cylindrical wall 90 of the inner member 30 extends upwardly from the base member 26 and hence becomes visible so as to indicate that the brake pedal 16 is depressed.

Figure 4:
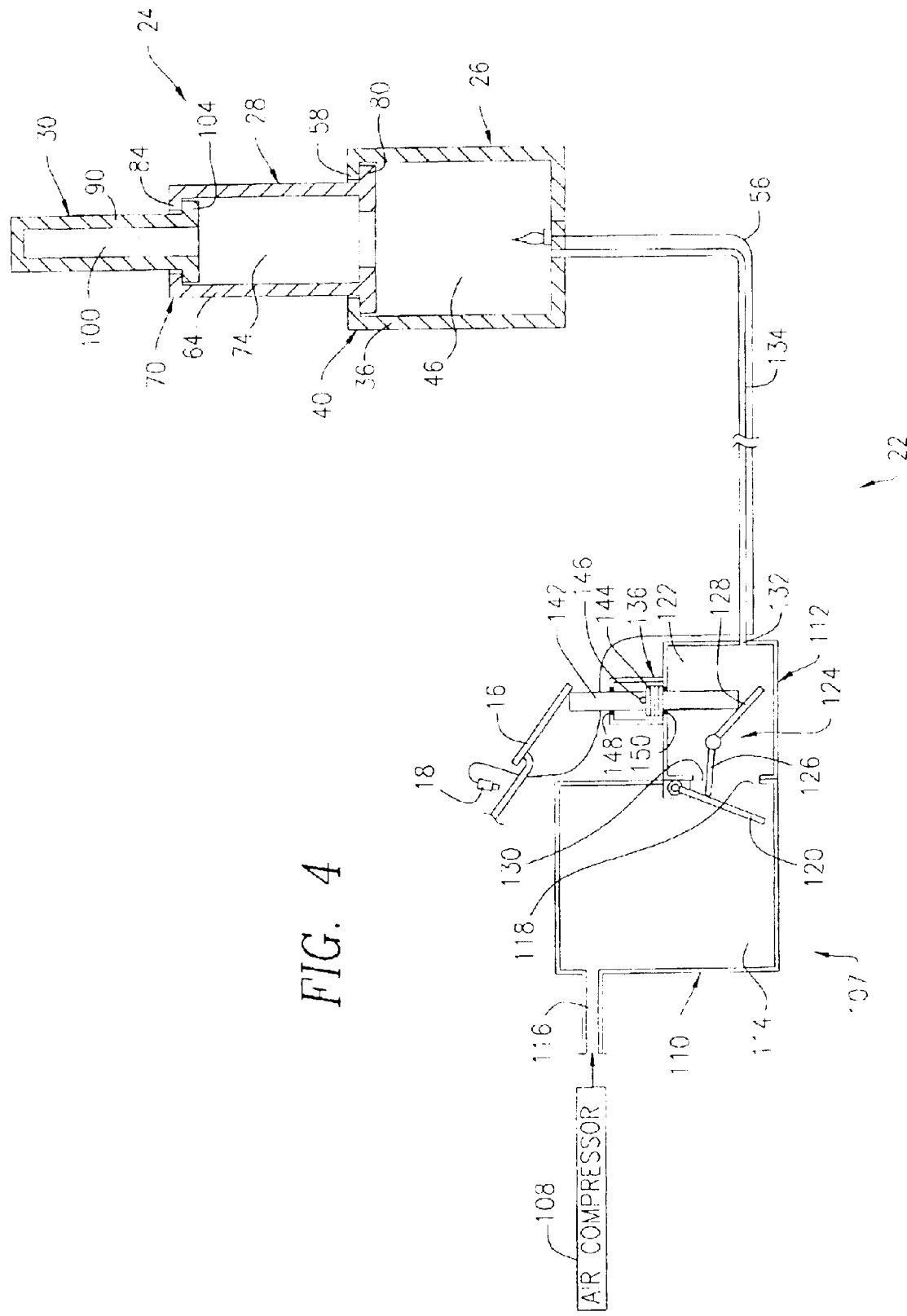
FIG. 4 is a view identical to FIG. 2, except that the brake pedal is in a fully depressed state.

When the brake pedal 16 is fully depressed, the actuator rod 142 is moved to its lower position, thereby causing the valve plate 120 to move to its fully open position (see FIG. 4). As a result, more pressurized air flows from the supply tank 110 to the telescoping signal unit 24, thereby fully pressurizing the opening 46 of the base member 26. In response, the intermediate member 28 moves from its retracted position (see FIG. 3) to its extended position (see FIG. 4). As a result, the cylindrical wall 64 of the intermediate member 28 extends outwardly from the base member 26 and hence becomes visible so as to indicate that the brake pedal 16 is fully depressed. The degree to which the telescoping signal unit 24 projects upwardly (i.e., the upward movement of the inner and intermediate members 30, 28 relative to the base member 26) is determined by the extent to which the brake pedal 16 is depressed. More particularly, the valve plate 120 is movable to one of an infinite number of positions between its open and closed positions in response to the depression of the brake pedal 16 and hence causes the intermediate and inner members 28, 30 to move to any one of an infinite number of positions between their retracted and extended positions. As a result, the telescoping signal unit 24 is adapted to accurately indicate the extent of depression of the brake pedal 16 and hence the extent of actuation of the brake system of the automobile 10. In this regard, the air compressor 108 is adapted to maintain the pressure in the chamber 114 at a predetermined pressure level sufficient to cause the intermediate member 28 and the inner member 30 to move to their extended positions when the pressurized air is supplied to the telescoping signal unit 24.

When the brake pedal 16 is released, the spring 144 causes the actuator rod 142 to move upwardly from its lower position to its upper position, and the lever 124 pivots back to its retracted position. As a result, the valve plate 120 moves from its open position (see FIG. 4) to its closed position (see FIG. 2), thereby inhibiting pressurized air from flowing from the supply tank 110 to the telescoping signal unit 24. Pressurized air contained in the telescoping signal unit 24 is vented through the outlet 52. As a result, the inner member 30 and the intermediate member 28 move from their extended positions to their retracted positions.

It should be noted that the present invention can have numerous variations and modifications. For instance, the telescoping signal unit 24 can be mounted anywhere on the automobile 10, provided that it is visible to other drivers. The telescoping signal unit 24 can also be mounted in different orientations such that the intermediate and/or inner members 28, 30 are movable in different directions (e.g., in a horizontal direction or in a vertically downward direction). In addition, more than one telescoping signal 24 units can be mounted on a vehicle. Moreover, the telescoping signal unit 24 can be illuminated by other source of light (e.g., an LED, a halogen bulb, fiber optics). The brake light system 22 can also utilize other mechanisms to move the telescoping signal unit 24 (e.g., a mechanical system, a vacuum system, an electrical system, etc.). In addition, the valve plate 120 can be freely pivotable (i.e., not spring-loaded) without affecting the utility or function of the present invention.

It will be understood that the embodiment described herein is merely exemplary and that a person skilled in the art may make many variations and modifications without departing from the spirit and scope of the invention. All such variations and modifications, including those discussed above, are intended to be included within the scope of the invention as defined in the appended claims.

What is claimed is:

1. A brake light system for a vehicle, comprising an indicating member movable between a first position and a second position, which is different from said first position, said indicating member being mounted in an opening; and a pressurized gas source for supplying pressurized gas to said opening, said indicating member being movable from said first position to said second position in response to the pressurization of said opening by pressurized gas supplied to said opening from said source when a brake system of a vehicle is actuated.

2. The brake light system of claim 1, wherein said indicating member is movable to any one of an infinite number of positions between said first position and said second position so as to indicate the extent of engagement of an associated brake system.

3. The brake light system of claim 1, further comprising a base member defining said opening, said indicating member being positioned in said opening when it is in said first position, said indicating member extending outwardly from said base member when it is in said second position, said base member being sized and shaped so as to be immovably mounted to an associated motor vehicle.

4. The brake light system of claim 3, wherein said indicating member includes a first member and a second member, said first member having an opening sized and shaped so as to receive said second member.

5. The brake light system of claim 4, wherein said first member is movable relative to said base member between a third position, in which it is located within said opening of said base member, and a fourth position, in which it extends vertically upwardly from said base member; and wherein said second member is movable relative to said first member between a fifth position, in which it is located within said opening of said first member, and a sixth position, in which it extends vertically upwardly from said first member.

6. The brake light system of claim 5, wherein said first member is movable to said fourth position from said third position in response to the pressurization of said opening of said base member; and said second member is movable to said sixth position from said fifth position in response to the pressurization of said opening of said base member.

7. The brake light system of claim 6, wherein said base member has a first flange projecting radially inwardly from said base member, said first member having a second flange, which projects radially outwardly from said first member, and a third flange, which projects radially inwardly from said first member, said second member having a fourth flange projecting radially outwardly from said second member, said second flange of said first member being engageable with said first flange of said base member so as to inhibit movement of said first member beyond said fourth position, said fourth flange of said second member being engageable with said third flange of said first member so as to inhibit movement of said second member beyond said sixth position.

8. The brake light system of claim 4, further comprising illuminating means for illuminating at least said first and second members.

9. The brake light system of claim 8, wherein said illuminating means includes a light bulb mounted on said base member.

10. The brake light system of claim 9, wherein said first and second members include first and second forward portions, respectively, said indicating member including first and second opaque layers mounted to said first and second forward portions, respectively, of said first and second members, respectively, so as to inhibit light transmitted from said light bulb from being reflected toward a front end of an associated vehicle.

11. The brake light system of claim 4, wherein said base member, said first member and said second member are concentric to one another.

12. The brake light system of claim 1, further comprising a conduit connecting said source to said opening, said conduit including a valve for controlling a flow of pressurized gas therethrough.

13. The brake light system of claim 12, wherein said valve has first and second states, said valve inhibiting a flow of pressurized gas from said source to said opening through said conduit when said valve is in said first state, said valve permitting a flow of pressurized gas from said source to said opening through said conduit when said valve is in said second state.

14. The brake light system of claim 13, wherein said indicating member is in said first position when said valve is in said first state; and said indicating member is in said second position when said valve is in said second state.

15. The brake light system of claim 14, wherein said valve includes an passage opening, which is formed in said conduit, and a valve member, which is movably mounted in said conduit for opening and closing said passage opening, said valve member being movable between an open position, in which said passage opening is open, and a closed position, in which said passage opening is closed by said valve member.

16. The brake light system of claim 15, wherein said valve member is movable to one of an infinite number of positions between said open and closed positions in response to the depression of a brake pedal of an associated motor vehicle such that said indicating member is movable to one of an infinite number of positions between said first and second positions.

17. The brake light system of claim 16, further comprising moving means for moving said valve member between said open and closed positions.

18. The brake light system of claim 17, wherein said moving means includes a lever for engaging said valve member, and an actuator rod for engaging said lever, said lever being movable between a third position, in which said valve member is in said closed position, and a fourth position, in which said valve member is in its said open position, said actuator rod being sized and shaped so as to be depressed from an upper position toward a lower position in response to the actuation of an associated brake pedal so as to cause said lever to move from said third position toward said fourth position.

19. The brake light system of claim 18, wherein said conduit includes a supply tank directly connected to said source, said supply tank having an outlet defining said passage opening, said valve member being pivotally mounted to said supply tank.

20. The brake light system of claim 19, wherein said conduit includes an outlet tank connected to said supply tank, said lever being pivotally mounted in said outlet tank, said actuator rod being movably mounted to said outlet tank.

21. A brake light system for a vehicle, comprising an indicating member movable between a first position and a second position, which is different from said first position, said indicating member being movable pneumatically from said first position to said second position in response to the actuation of a brake system of a vehicle; and a base member defining an opening, said opening being sized and shaped so as to be pressurized in response to the actuation of an associated brake system, said indicating member being positioned in said opening when it is in said first position, said indicating member extending outwardly from said base member when it is in said second position, said base member being sized and shaped so as to be immovably mounted to an associated motor vehicle, said indicating member including a first member and a second member, said first member having an opening sized and shaped so as to receive said second member, said first member being movable relative to said base member between a third position, in which it is located within said opening of said base member, and a fourth position, in which it extends vertically upwardly from said base member, said second member being movable relative to said first member between a fifth position, in which it is located within said opening of said first member, and a sixth position, in which it extends vertically upwardly from said first member.

22. The brake light system of claim 21, wherein said first member is movable to said fourth position from said third position in response to the pressurization of said opening of said base member; and said second member is movable to said sixth position from said fifth position in response to the pressurization of said opening of said base member.

23. The brake light system of claim 22, wherein said base member has a first flange projecting radially inwardly from said base member, said first member having a second flange, which projects radially outwardly from said first member, and a third flange, which projects radially inwardly from said first member, said second member having a fourth flange projecting radially outwardly from said second member, said second flange of said first member being engageable with said first flange of said base member so as to inhibit movement of said first member beyond said fourth position, said fourth flange of said second member being engageable with said third flange of said first member so as to inhibit movement of said second member beyond said sixth position.

\* \* \* \* \*